(12) United States Patent
Tanaka et al.

(10) Patent No.: US 8,733,940 B2
(45) Date of Patent: May 27, 2014

(54) LIGHT SOURCE DEVICE AND PROJECTION DISPLAY APPARATUS

(75) Inventors: Takaaki Tanaka, Osaka (JP); Hiroshi Kitano, Hyogo (JP)

(73) Assignee: Panasonic Corporation, Osaka (JP)

( * ) Notice: Subject to any disclaimer, the term of this patent is extended or adjusted under 35 U.S.C. 154(b) by 390 days.

(21) Appl. No.: 13/312,204

(22) Filed: Dec. 6, 2011

(65) Prior Publication Data

US 2012/0140183 A1 Jun. 7, 2012

(30) Foreign Application Priority Data

Dec. 6, 2010 (JP) ................................ 2010-271050

(51) Int. Cl.
*G03B 21/14* (2006.01)

(52) U.S. Cl.
USPC ............................................................ 353/20

(58) Field of Classification Search
CPC ............ G03B 21/204; G03B 21/2013; G03B 21/2033; H04N 9/3161
USPC .............. 353/20; 362/19; 359/483.01–494.01
See application file for complete search history.

(56) References Cited

U.S. PATENT DOCUMENTS

2009/0034284 A1 2/2009 Li et al.
2013/0242264 A1* 9/2013 Saitou ............................. 353/20

FOREIGN PATENT DOCUMENTS

JP 2004-341105 12/2004
JP 2010-086815 4/2010

* cited by examiner

*Primary Examiner* — Georgia Y Epps
*Assistant Examiner* — Danell L Owens
(74) *Attorney, Agent, or Firm* — Hamre, Schumann, Mueller & Larson, P.C.

(57) ABSTRACT

A light source device has: a light source unit including solid-state light sources emitting blue-color light and a condensing lens; a dichroic mirror polarization separating color light into first and second polarization components; a fluorescence emission plate excited with the first polarization component, emitting fluorescence of green and red components to enter the dichroic mirror; a first retardation plate converting the second polarization component to a circularly polarized light; and a reflection plate reflecting a light passed through the first retardation plate to reenter the same. The color lights from the fluorescence emission plate and the first retardation plate are combined at the dichroic mirror. A second retardation plate converts the polarization direction of the light from the light source unit, so as to control the ratio of p-polarization and s-polarization components. Lights from solid-state light sources are condensed efficiently and a high spectrum-utilization factor is obtained.

27 Claims, 7 Drawing Sheets

LIGHT SOURCE DEVICE AND PROJECTION DISPLAY APPARATUS

BACKGROUND OF THE INVENTION

1. Field of the Invention

The present invention relates to a light source device using fluorescence obtained by condensing lights from a number of solid-state light sources and exciting a phosphor, and a projection display apparatus using the light source device.

2. Description of Related Art

Discharge lamps have been used widely as light sources for projection display apparatuses using light valves formed of liquid crystals or a mirror-deflection type digital micro-mirror devices (DMD). However, the problem of such a discharge lamp is the low reliability due to the short life. For solving this problem, a projection display apparatus, which uses a solid-state light source such as a semiconductor laser and a light-emitting diode for the light source in place of the discharge lamp, has been studied.

FIG. 8 shows a configuration disclosed in JP 2004-341105 A as an example of a conventional projection display apparatus using a solid-state light source and DMD. Ultraviolet light from a light-emitting diode 101 enters disc-like color wheel 102. On the color wheel 102, a reflective film that transmits the ultraviolet light and reflects visible light is formed. The exiting-side surface of the reflective film is divided in the circumferential direction of the disc into three regions, and red, green and blue phosphor layers are formed on the respective regions, so that red, green and blue color lights are emitted due to the incident ultraviolet light. The emitted lights pass through a relay lens 103, which are reflected by a reflection mirror 104, and reflected by a prism 105, thereby entering a DMD 106. The light entering the DMD 106 is spatially modulated by the DMD 106 in accordance with the video signal, and the modulated light is magnified and projected by a projection lens 107.

A typical solid-state light sources such as a semiconductor laser and a light-emitting diode emits a smaller amount of light beams in comparison with a discharge lamp. Therefore, it is difficult to obtain a high brightness with the configuration as illustrated in FIG. 8. With regard to this circumstance, a potential method of improving the brightness of a light source device using a solid-state light source is to excite a phosphor by using a number of solid-state light sources so as to emit fluorescence, thereby increasing the light beams.

SUMMARY OF THE INVENTION

The present invention aims to provide a light source device that condenses efficiently lights from a large number of solid-state light sources and has a high spectrum utilization factor of light emission obtained by exciting a phosphor.

Further, the present invention aims to provide a projection display apparatus constructed by using such a light source device.

A first light source device of the present invention includes: a solid-state light source unit that comprises a plurality of solid-state light sources emitting blue color light and a condensing lens; a dichroic mirror that polarization separates a color light from the solid-state light source unit into a first polarization component and a second polarization component and that combines the blue color light with green and red color lights; a fluorescence emission plate that is excited with the first polarization component so as to emit green and red component fluorescence and make the lights enter the dichroic mirror; a first retardation plate that converts the second polarization component into a circularly polarized light; and a reflection plate that reflects a light that passed through the first retardation plate and makes the lights enter again the first retardation plate. Thereby, the light source device combines the color light from the fluorescence emission plate and the color light that has passed again through the first retardation plate at the dichroic mirror so as to emit a white color light. A second retardation plate is arranged between the solid-state light source unit and the dichroic mirror so as to convert the polarization direction of the light from the solid-state light source unit and to control the ratio of lights of p-polarization component and s-polarization component entering the dichroic mirror to be constant.

A second light source device of the present invention includes: a first solid-state light source unit that comprises a plurality of first solid-state light sources and a condensing lens; a dichroic mirror that reflects a color light from the first solid-state light source unit and combines a blue color light with green and red color lights; a first condensing portion that condenses the color light exiting from the first solid-state light source and reflected by the dichroic mirror; a fluorescence emission plate that is excited with the light condensed at the first condensing portion so as to emit fluorescence of green and red components and make the fluorescence enter the dichroic mirror; a second solid-state light source unit that comprises a second solid-state light source; and a second condensing portion that condenses lights from the second solid-state light source unit. Thereby, the light source device combines the color light from the fluorescence emission plate and the color light from the second retardation plate at the dichroic mirror so as to emit a white color light. A retardation plate is arranged between the first solid-state light source unit and the dichroic mirror so as to convert the polarization direction of the light from the first solid-state light source unit so as to provide a s-polarized light.

A projection display apparatus of the present invention includes: a light source device that emits a white color light; an illuminating portion that condenses the light from the light source device and forms an illumination light; a color-separating portion that separates the white color light from the illuminating portion into respective blue, green and red color lights; three liquid crystal light valves that spatially modulate the respective color lights that have been color-separated and form respectively image lights; a color-combining portion that combines the image lights of blue, green and red color lights exiting from the liquid crystal light valves; and a projection lens that magnifies and projects the image lights combined at the color-combining portion. The above-described light source device is any of the above-described light source devices having any of the above-described configurations.

According to the present invention, since the polarization direction of light exiting from the solid-state light source is converted by a retardation plate arranged between the solid-state light source unit and the dichroic mirror, the light quantity ratio of fluorescence emitted by the fluorescence emission plate to a light from the solid-state light source is adjusted to be optimum, and thus a light source device of a high efficiency can be provided.

Further, by use of a light source device of the present invention, a long-life and bright projection display apparatus can be obtained.

DETAILED DESCRIPTION OF THE INVENTION

The light source device of the present invention may have the following state on the basis of the above configuration.

Namely, a first light source device may be constituted to include a condensing portion that is arranged between the dichroic mirror and the fluorescence emission plate and that condenses the first polarization component polarization separated at the dichroic mirror. Thereby the light condensed at the condensing portion enters the fluorescence emission plate.

In a first or second light source device, either the solid-state light source or the first solid-state light source may be a blue semiconductor laser.

Further, the light exiting from the solid-state light source or the first solid-state light source may be a linearly polarized light.

Further, the second solid-state light source may be a light-emitting diode.

Further, the solid-state light source unit may be composed of a plurality of solid-state light source units.

In the first light source device, the first retardation plate may be a quarter wave plate. Furthermore, the second retardation plate may be a half wave plate.

In the second light source device, the retardation plate may be a half wave plate.

The first or second light source device may have a rotational adjusting mechanism for changing the optical axis direction of the retardation plate.

Further, the fluorescence emission plate may be of a disc shape controllable to rotate.

The fluorescence emission plate may have a phosphor layer arranged proximally to the dichroic mirror and a reflective film arranged distally from the dichroic mirror relative to the phosphor layer. The phosphor layer may be formed of a Ce-activated YAG yellow phosphor.

A diffusion plate may be provided between either the solid-state light source unit or the first solid-state light source unit and the dichroic mirror.

In the projection display apparatus having the above-described configuration, the liquid crystal light valve may be constituted of transmission type liquid crystal panels.

Hereinafter, embodiments of the present invention will be explained with reference to attached drawings.

Embodiment 1

Figure 1A:
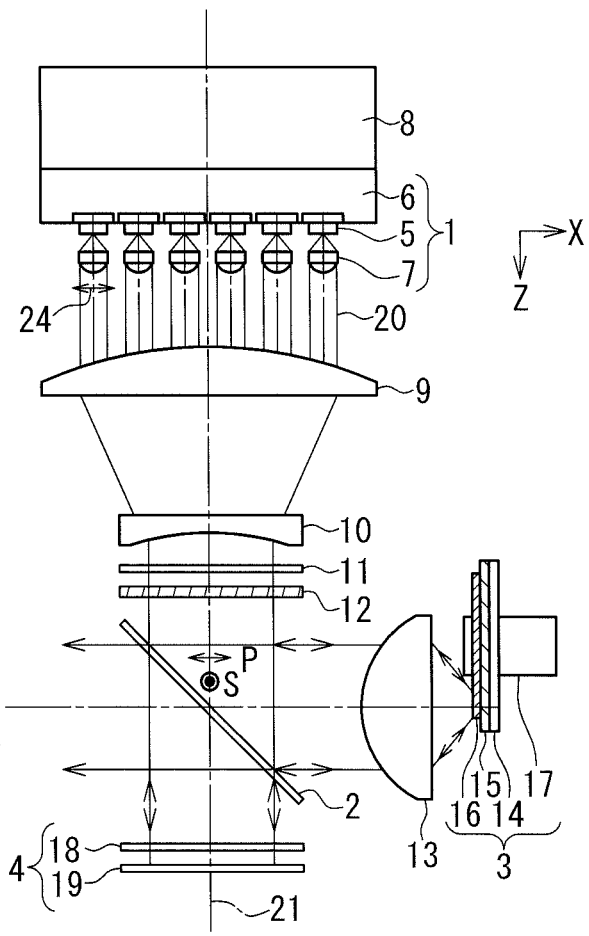
FIG. 1A is a front view showing a configuration of a light source device according to Embodiment 1 of the present invention.

FIG. 1A is a front view showing a configuration of a light source device according to Embodiment 1 of the present invention. This light source device includes as basic elements a solid-state light source unit 1, a dichroic mirror 2, a fluorescence emission plate 3 and a polarization direction converting portion 4. The dichroic mirror 2 polarization separates the incident light by reflecting the s-polarization component and transmitting the p-polarization component. The fluorescence emission plate 3 is excited with the s-polarization component and emits fluorescence. The p-polarization component is converted into the s-polarization component by the polarization direction converting portion 4 and reflected by the dichroic mirror 2. Thereby, a color light from the fluorescence emission plate 3 and a color light from the polarization direction converting portion 4 are combined at the dichroic mirror 2 and exit there.

The solid-state light source unit 1 has semiconductor lasers 5 as solid-state light sources, a heat-dissipating plate 6 and condensing lenses 7. The heat-dissipating plate 6 is attached to a heat sink 8. A light exiting from the solid-state light source unit 1 passes through lenses 9, 10, a diffusion plate 11 and a half wave plate 12 as a second retardation plate, and then enters the dichroic mirror 2. A condenser lens 13 is arranged between the dichroic mirror 2 and the fluorescence emission plate 3. The fluorescence emission plate 3 is constituted of a disc-shaped glass substrate 14 on which a reflective film 15 and a phosphor layer 16 are formed, and rotated by a motor 17. The polarization direction converting portion 4 is constituted of a quarter wave plate 18 as a first retardation plate and a reflection plate 19.

Figure 1B:
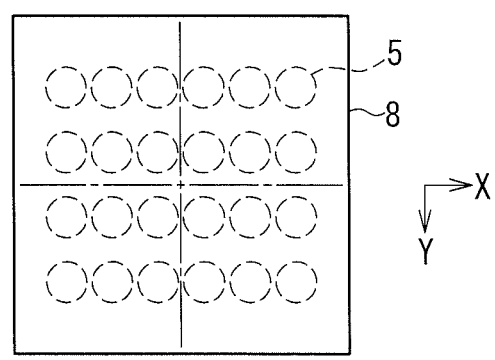
FIG. 1B is a plan view of a solid-state light source unit constituting the light source device.

The drawing illustrates the state of the respective light beams 20 exiting from the solid-state light source unit 1. Further an optical axis 21 of this light source device is illustrated. FIG. 1B is a plan view showing the solid-state light source unit 1 observed through the heat sink 8, where arrangements of a plurality of semiconductor lasers 5 are illustrated with broken lines.

In the solid-state light source unit 1, twenty-four (6×4) semiconductor lasers 5 are arranged in a square matrix symmetrically to the optical axis 21 on the heat-dissipating plate 6 two-dimensionally (xy-axis plane) at a constant spacing. Further, the condensing lenses 7 are disposed to correspond to the respective semiconductor lasers 5. The heat sink 8 is to cool down the solid-state light source unit 1. The semiconductor lasers 5 emit blue color light at wavelength of 440 nm to 455 nm, and the light exits as a linearly polarized light.

Figure 2:
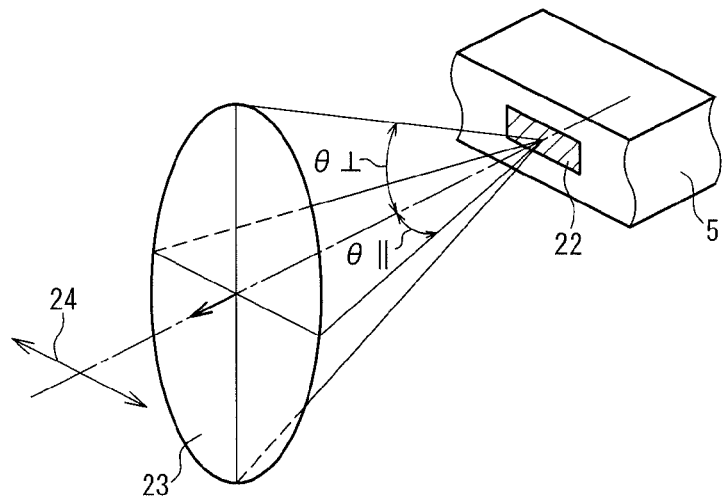
FIG. 2 is a perspective view showing a state of emission of a semiconductor laser constituting the light source device.

FIG. 2 shows an state of light emission from each of the semiconductor laser 5. A light beam 23 from an active layer 22 as a light-emitting portion of the semiconductor laser 5 spreads in accordance with the theory of Gaussian beam propagation. The beam divergence angle $\theta_\parallel$ in a direction parallel to the active layer 22 is about 10°. The beam divergence angle $\theta_\perp$ in a direction perpendicular to the active layer 22 is about 30°, which is about 3 times in comparison with the angle in the parallel direction. And the exiting light is polarized linearly inside the semiconductor laser 5, and this polarization direction 24 becomes parallel to the active layer 22.

As shown in FIG. 1, in a case of condensing the light exiting from the semiconductor lasers 5 with the condensing lenses 7, the effective region of the condensing lenses 7 can be decreased when the beam divergence angle $\theta$ is smaller. For this reason, a larger number of semiconductor lasers 5 are arranged in a direction parallel to the active layer 22, thereby miniaturizing the solid-state light source unit 1. The lights exiting from the plural semiconductor lasers 5 are condensed respectively by the corresponding condensing lenses 7 so as to be converted into parallel light beams 20. The light beams 20 enter the diffusion plate 11 after the diameter of each light beam is decreased further by the convex lens 9 and the concave lens 10. The diffusion plate 11 made of glass diffuses light with the fine concave-convex shape of its surface. The light from the diffusion plate 11 enters the half wave plate 12.

The half wave plate 12 is a retardation plate with which the phase difference in the vicinity of the dominant wavelength of the light emission by the semiconductor lasers 5 will be approximately a half wavelength, and it converts the polarization direction of the incident linearly polarized light. The half wave plate 12 is constituted of a stretched film, crystal or the like. The half wave plate 12 is arranged to allow a rotational adjustment of an angular position of the optical axis thereof such that the s-polarization component of a light entering the dichroic mirror 2 will be about 90 to 70% and the p-polarization component of the same light will be about 10 to 30%. In the drawing, the directions of the p-polarization and the s-polarization of light entering the dichroic mirror 2 are illustrated.

Figure 3:
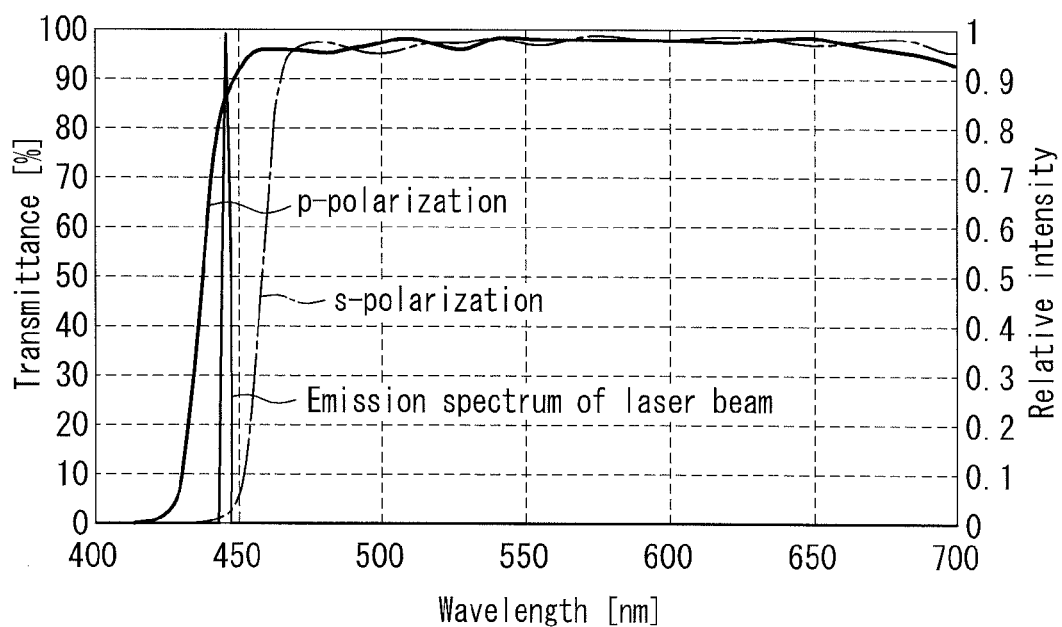
FIG. 3 is a graph showing a spectral characteristic of a dichroic mirror constituting the light source device and an emission spectrum of a laser beam.

FIG. 3 shows a spectral characteristic of the dichroic mirror 2 and an emission spectrum of a laser beam from the semiconductor laser 5. The spectral characteristic of the dichroic mirror 2 is illustrated as a transmittance with respect to the wavelength. The emission spectrum is illustrated as a relative intensity with respect to the wavelength. The dichroic mirror 5 reflects the s-polarized light of the semiconductor laser beam in the vicinity of wavelength of 445 nm, while it transmits the p-polarized light and transmits green and red color lights. Thereby, light beams to be reflected or pass through are controlled in accordance with the state of polarization direction, so that the incident light is polarization separated into a first polarization component and a second polarization component.

The light beam of s-polarization (first polarization component) reflected at the dichroic mirror 2 in FIG. 1 is condensed by the condenser lens 13, superimposed as a spot light having a diameter of 1 mm to 3 mm and whose optical intensity is 13.5% with respect to the peak intensity, thereby entering the fluorescence emission plate 3. The diffusion plate 11 diffuses the light so that the light spot will have a desired diameter.

The fluorescence emission plate 3 can be controlled to rotate by the motor 17 of the central unit. The reflective film 15 is a dielectric thin film that reflects visible light. The phosphor layer 16 is formed of a Ce-activated YAG yellow phosphor that is excited with a blue color light so as to emit yellow color light containing green and red components. A representative chemical composition of the crystal matrix of this phosphor is $Y_3Al_5O_{12}$. The phosphor layer 16 is formed in an annular shape. By rotating the fluorescence emission plate 3, temperature rise in the phosphor caused by the exciting light is suppressed, and thus the fluorescence conversion efficiency can be maintained stably.

The yellow color light that is emitted by the phosphor layer 16 excited with the spot light and that contains green and red components exits from the fluorescence emission plate 3. However, the light radiated toward the reflective film 15 is reflected by the reflective film 15 so as to exit from the fluorescence emission plate 3. The green and red color lights exiting from the fluorescence emission plate 3 are condensed at the condenser lens 13 and converted into substantially parallel lights, and then pass through the dichroic mirror 2.

On the other hand, the blue color light of p-polarization (second polarization component) that has passed through the dichroic mirror 2 enters the quarter wave plate 18 as a first retardation plate. The quarter wave plate 18 is constituted of a stretched film or crystal such that the phase difference will be about a quarter wavelength in the vicinity of the dominant wavelength of the emission of the semiconductor lasers 5. The incident light of p-polarization is converted into a circularly polarized light at the quarter wave plate 18, and after a phase inversion at a reflection plate 19, the polarization of the light is converted again at the quarter wave plate 18 to s-polarized light. The reflection plate 19 is prepared by forming an aluminum reflective film and a dielectric film on a glass substrate. The blue color light that has been converted into s-polarized light is reflected at the dichroic mirror 2. In an alternative construction, the light may be condensed by use of the condenser lens and then reflected at the reflection plate 19, while the light that passed through the quarter wave plate 18 is reflected at the reflection plate 19 in the configuration illustrated in FIG. 1.

Figure 4:
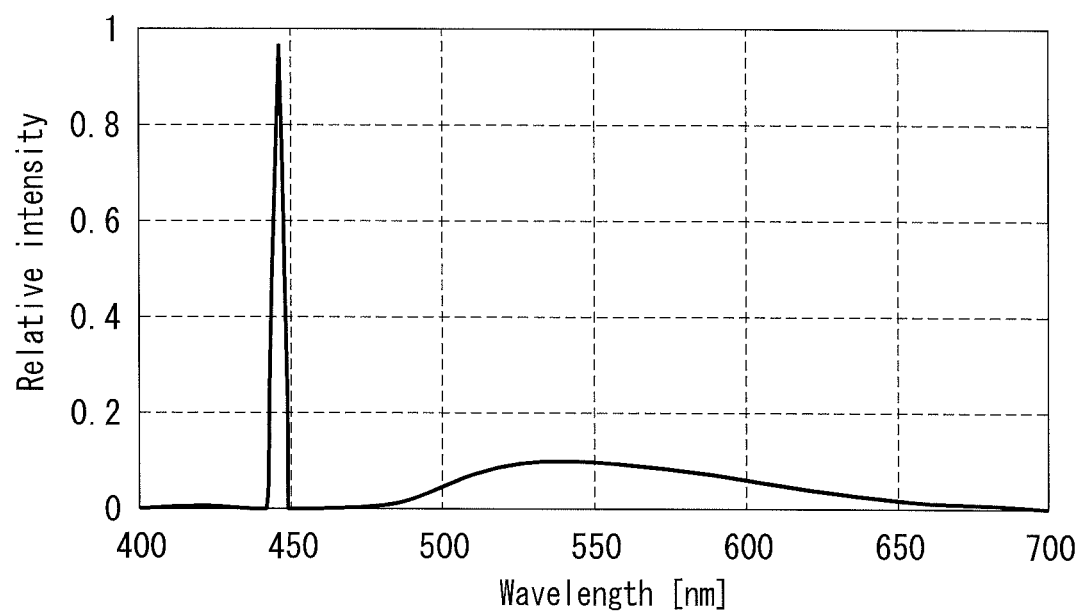
FIG. 4 is a graph showing a spectral characteristic of a light exiting from by the light source device.

In this manner, the fluorescence of green and red components from the fluorescence emission plate 3 and the blue color light from the semiconductor lasers are combined at the dichroic mirror 2, then exit as a white color light. FIG. 4 shows a spectral characteristic of the exiting white color light. Due to the yellow color light containing the green and red components of the fluorescence and the blue color light by the semiconductor lasers, a luminescence property with a favorable white balance can be obtained. With this emission spectral characteristic, when the light is separated at the optical system of a projection display apparatus into the three primary colors of blue, green and red, a monochromatic light of desired chromaticity coordinates can be obtained without losses.

According to the above-mentioned configuration, due to the disposition of the half wave plate 12 and its rotation, it is possible to control the amount of light entering the fluorescence emission plate 3, the quarter wave plate 18 and the reflection plate 19, so that the light amount ratio of the blue color light to the yellow color light can be controlled. Thereby, it is possible to easily correct and adjust the shift from a desired white balance, which is caused by variation in the optical system of the projection display apparatus, variation in the output light from the solid-state light source units, variation in the fluorescence conversion efficiency of the fluorescence emission plate, or the like.

Though a single solid-state light source unit 1 is used in the configuration as shown in FIG. 1, it is also possible to use a plurality of solid-state light source units and to combine the exiting lights for use. Further, the above description relates to a case where the dichroic mirror 2 has a blue reflection property and a green and red transmission property. It is also possible to use a mirror having a blue transmission property and green and red reflection property.

As mentioned above, the light source device of the present embodiment polarization separates the blue color light from the solid-state light source unit having a plurality of semiconductor lasers, by use of a rotation-adjustable half wave plate and a dichroic mirror, and then excites a phosphor with a blue color light of one of the polarized lights after the separation so as to emit a yellow color light that contains green and red components. The emitted yellow color light and the blue color light of the other polarization are combined at a desired balance to obtain a white color light, thereby obtaining a light source device of a high brightness, which emits favorable white-balanced light at high efficiency.

Embodiment 2

Figure 5:
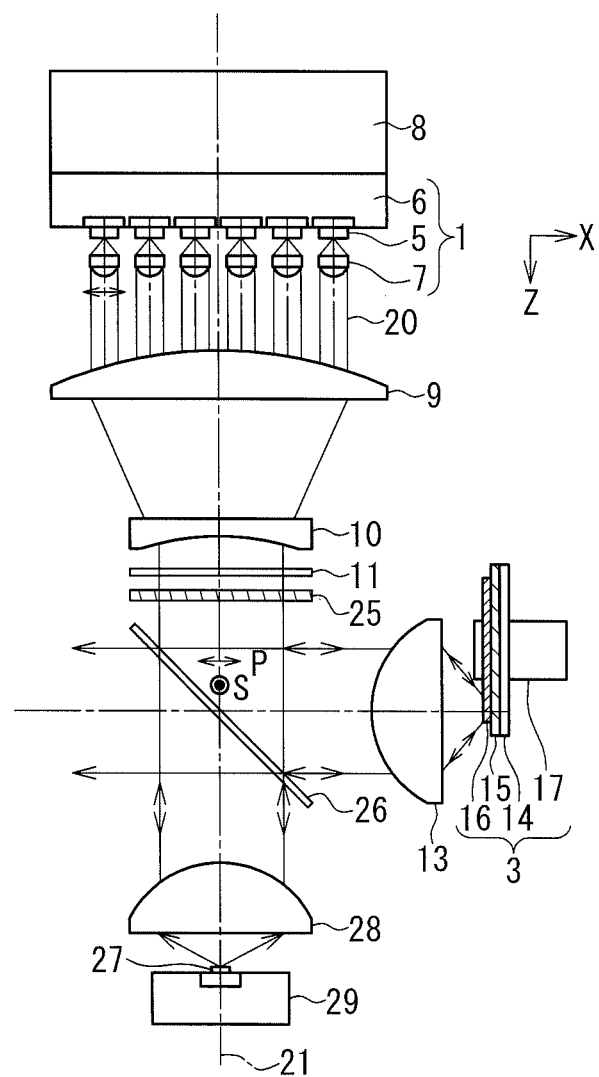
FIG. 5 is a front view showing a configuration of a light source device according to Embodiment 2 of the present invention.

FIG. 5 is a front view showing a configuration of a light source device in Embodiment 2 of the present invention. This light source device is different from the light source device in Embodiment 1 in that the blue color light to be combined for obtaining a white color light is not a light exiting from the semiconductor laser 5 but a blue color light from a light-emitting diode. Except for some elements modified for this reason, the constructions of the elements such as the solid-state light source unit 1 and the fluorescence emission plate 3 are the same as those in Embodiment 1, and thus common elements are assigned with the same reference numbers in order to avoid duplicated explanation.

In FIG. 5, the half wave plate 25 and the dichroic mirror 26 correspond to the half wave plate 12 and the dichroic mirror 2 in FIG. 1A. However, the half wave plate 25 is configured to rotate the polarization direction of the linearly polarized light by about 90 degrees. Further, a blue reflection dichroic mirror 26 in use has a spectral characteristic different from that of the dichroic mirror 2 in FIG. 1A. In place of the polarization direction converting portion 4 in FIG. 1A, a second solid-state light source unit including a light-emitting diode 27, a condenser lens 28 and a heat sink 29 is provided.

Lights exiting from the plural semiconductor lasers 5 are condensed respectively by corresponding condensing lenses 7 so as to be converted into parallel light beams 20. The light beams 20 entering the lens 9 are decreased in the diameter further by the lenses 9, 10 and diffused at the diffusion plate 11, and then enter the half wave plate 25. The half wave plate 25 is disposed so that an optical axis thereof is oriented to rotate by about 90 degrees the polarization direction of incident linearly polarized light, and arranged so that the angular position of the optical axis can be adjusted. The light whose polarization is rotated at the half wave plate 25 enters the dichroic mirror 26.

Figure 6:
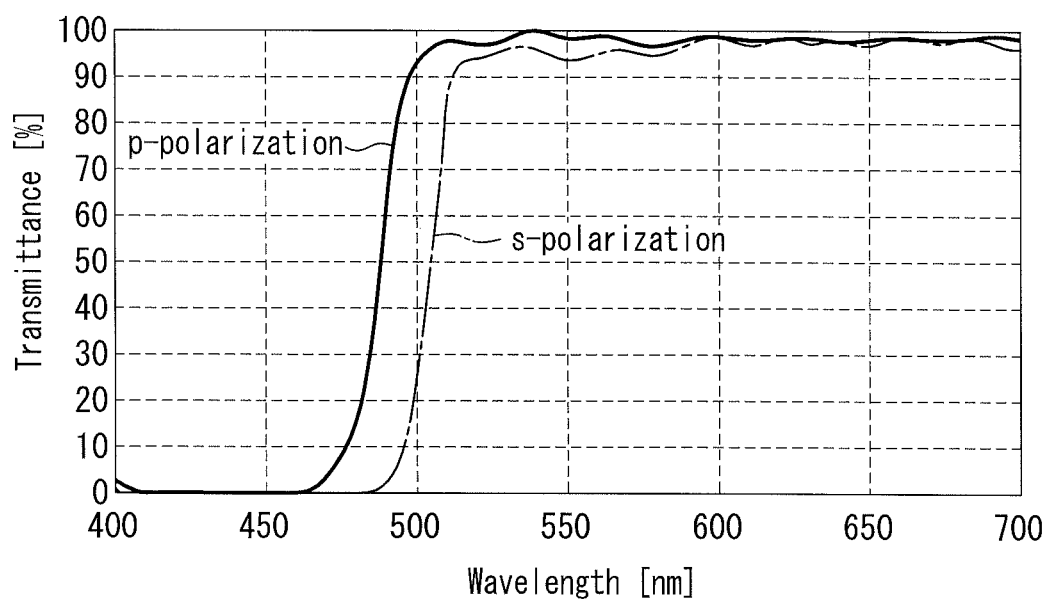
FIG. 6 is a graph showing a spectral characteristic of a dichroic mirror constituting the light source device.

FIG. 6 shows the spectral characteristic of the dichroic mirror 26. The dichroic mirror 26 has a characteristic of reflecting the light from the solid-state light source unit 1 and the light from the light-emitting diode 27 while transmitting green and red color component lights. In order to arrange the semiconductor lasers 5 at high density in a small size, an exiting light of p-polarization is converted into a light of s-polarization by use of the half wave plate 25. Since rotation of the half wave plate 25 is adjustable, a light to be reflected toward the fluorescence emission plate 3 can be reflected at the highest reflectance. In addition, the light from the light-emitting diode 27 can be reflected at a high reflectance.

A light, which passes through the half wave plate 25 and then is reflected at the dichroic mirror 26, is condensed by the condenser lens 13, superimposed as spot lights 1-3 mm in diameter and enters the fluorescence emission plate 3. The phosphor layer 16 is excited with the spot lights, emitting a yellow color light containing green and red components. A yellow color light exiting from the fluorescence emission plate 3 is condensed at the condenser lens 13 and converted into a substantially parallel light, and thereafter passes through the dichroic mirror 26. On the other hand, the blue color light emitted by the light-emitting diode 27 is condensed at the condenser lens 28, converted into a substantially parallel light, thereafter reflected at the dichroic mirror 26. The light-emitting diode 27 is cooled by the heat sink 29 so that the luminescence property is maintained stably.

In this manner, a yellow fluorescence emitted by the fluorescence emission plate 3 and containing green and red components is combined with a blue color light from the light-emitting diode 27 so that a white color light is emitted. Since the light in use is not a semiconductor laser beam but a light emitted by the light-emitting diode 27, a high-quality image light free from occurrence of a speckle inherent in a laser beam can be obtained. Though a single light-emitting diode 27 is illustrated in the configuration of FIG. 5, it is also possible to constitute a second solid-state light source unit by using a plurality of light-emitting diodes.

As mentioned above, the light source device in the present embodiment condenses light beams from the solid-state light source constituted of a plurality of semiconductor lasers onto a fluorescent emission plate efficiently by use of a half wave plate, thereby obtaining a fluorescence of a yellow color light. Since a white color light is obtained by combining the yellow color light and the blue color light from the light-emitting diode, a white color light of high-quality and favorable white balance free from occurrence of speckle can be obtained.

Embodiment 3

Figure 7:
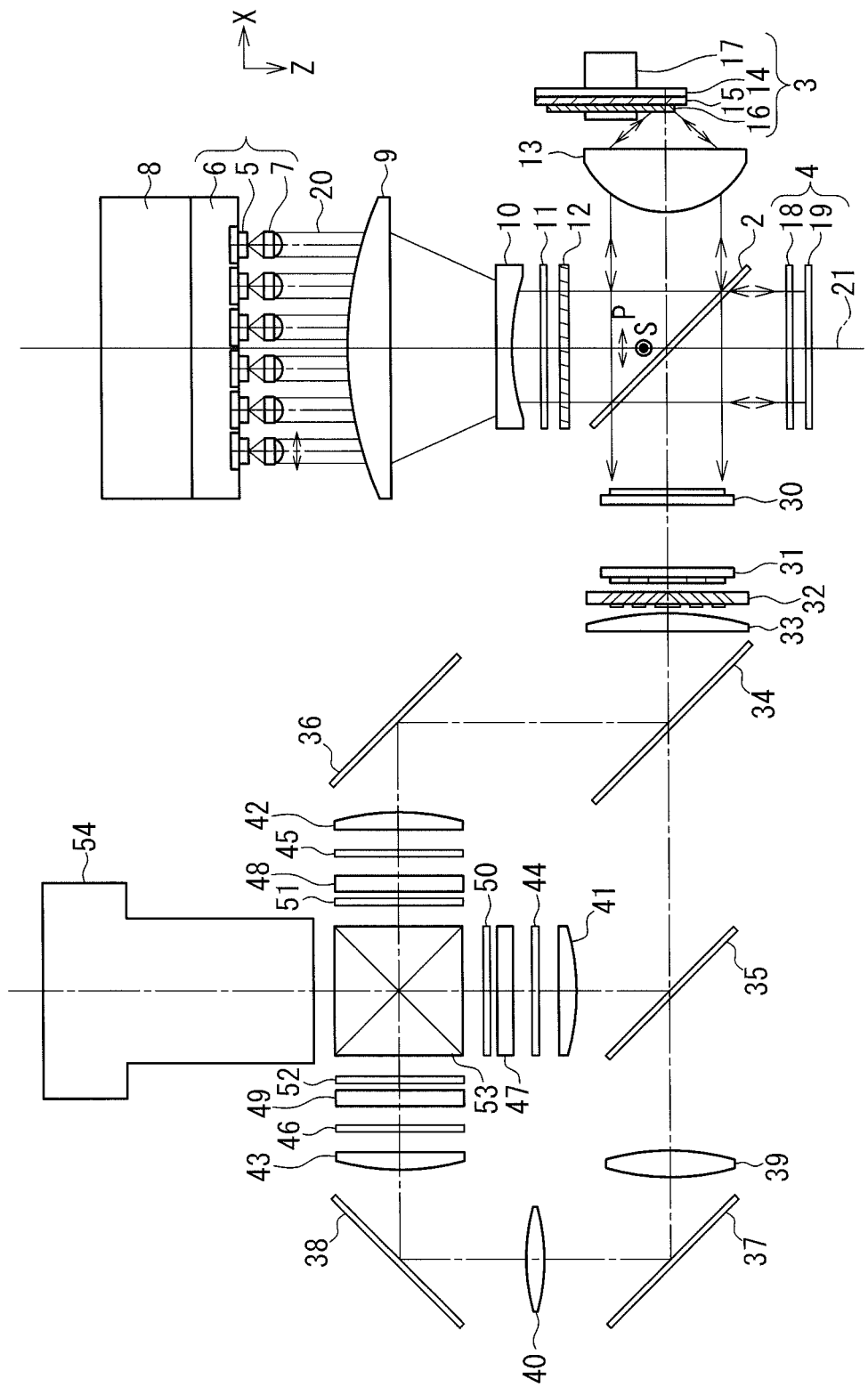
FIG. 7 is a front view showing a configuration of a projection display apparatus according to Embodiment 3 of the present invention.
Figure 8:
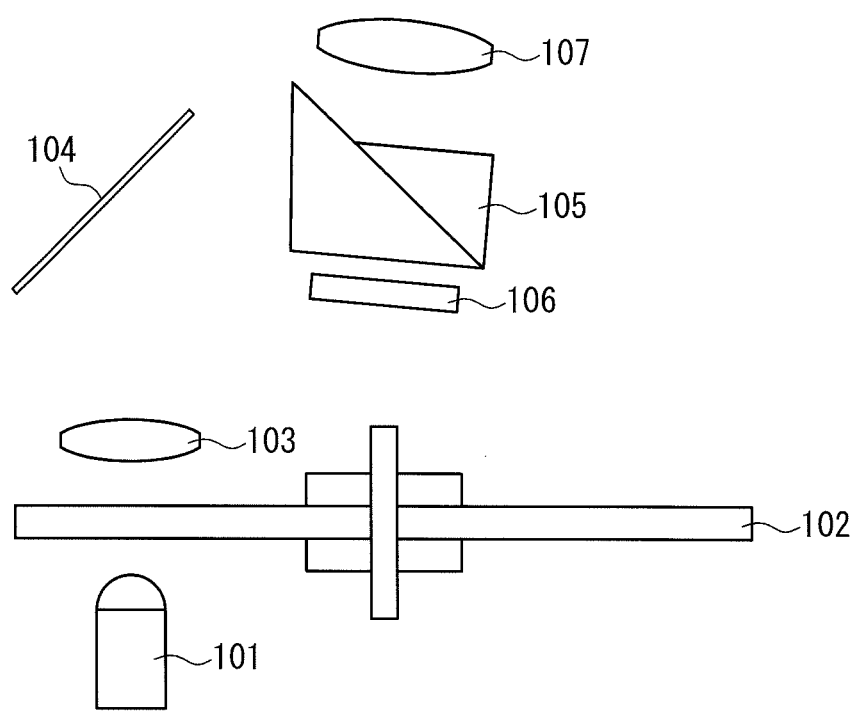
FIG. 8 is a front view showing a configuration of a conventional projection display apparatus.

FIG. 7 shows a projection display apparatus in Embodiment 3 of the present invention. This projection display apparatus is constructed by using the light source device according to Embodiment 1. Therefore, common elements are assigned with the same reference numbers as in Embodiment 1 in order to avoid duplicated explanation.

In the present embodiment, a TN mode or a VA mode transmission type liquid crystal panel of an active matrix system, having a thin film transistor formed on the pixel region, is used for the light valve.

An illuminating portion that condenses the light exiting from the dichroic mirror 2 of the light source device so as to form an illumination light is constituted of a first and second lens array plates 30, 31, a polarization converting optical element 32, and a superimposing lens 33. A color-separating portion for color-separating the illumination light that has passed through the superimposing lens 53 and making the lights enter the liquid crystal light valve for the respective color lights is constituted of a blue reflection dichroic mirror 34, a green reflection dichroic mirror 35, reflection mirrors 36, 37, 38, and relay lenses 39, 40.

A light valve portion for forming an image light from the respective color lights obtained by color-separation is constituted of: field lenses 41, 42, 43; incident side polarizing plates 44, 45, 46; liquid crystal panels 47, 48, 49; and emission-side polarizing plates 50, 51, 52. A projection optical system for combining the image lights of the respective color lights for the purpose of magnification and projection is constituted of: a color-combining prism 53 that is constituted of a red reflection dichroic mirror and a blue reflection dichroic mirror; and a projection lens 54.

In the above configuration, the white color light from the light source device enters the first lens array plate 30 composed of a plurality of lens elements and divided into a number of light beams. Each lens element of the first lens array plate 30 has an aperture shape that is similar to the shape of the liquid crystal panels 47, 48, 49. The divided large number of light beams are converged onto the second lens array plate 31 that is constituted of a plurality of lenses. The focal length of the lens elements of the second lens array plate 31 is determined such that the first lens array plate 30 and the liquid crystal panels 47, 48, 49 are substantially in a conjugate relationship.

The light exiting from the second lens array plate 31 enters the polarization converting optical element 32. The polarization converting optical element 32 is constituted by a polarized light separating prism and a half wave plate, and converts natural light from the light source into a light having one polarization direction. The light from the polarization converting optical element 32 enters the superimposing lens 33. The superimposing lens 7 has a function of superimposing the lights exiting from the respective lens elements of the second lens array plate 31 so as to illuminate the liquid crystal panels 47, 48, 49.

A light exiting from the superimposing lens 33 is separated into blue, green, and red color lights by the blue reflection dichroic mirror 34 and the green reflection dichroic mirror 35. The green color light passes through the field lens 41 and the incident-side polarizing plate 44, and thereafter enters the liquid crystal panel 47. The blue color light is reflected by the reflection mirror 36, thereafter passes through the field lens 42 and the incident-side polarizing plate 45, and enters the liquid crystal panel 48. The red color light is transmitted and refracted by the relay lenses 39, 40, reflected by the reflection mirrors 37, 38, passes through the field lens 43 and the incident-side polarizing plate 46, and enters the liquid crystal panel 49.

The three liquid crystal panels 47, 48, and 49 change the polarization state of the incident light in accordance with the control of the voltage applied to pixels according to a video signal. The incident-side polarizing plates 44, 45, 46 and the emission-side polarizing plates 50, 51, and 52 are arranged on both sides of the liquid crystal panels 47, 48, and 49 respectively, such that the transmission axes are orthogonal to each other. Thereby, the light is modulated spatially in accordance with the polarization states of the liquid crystal panels 47, 48, 49, and thus the image lights of green, blue and red are formed.

The respective color lights that have passed through the emission-side polarizing plates 50, 51, and 52 enter the color-combining prism 53, where the red color light is reflected by the red reflection dichroic mirror and the blue color light is reflected by the blue reflection dichroic mirror, which are combined with the green color light and then enter the projection lens 54. The light entering the projection lens 54 is magnified and projected on a screen (not shown).

As mentioned above, since the light source device is constituted by a plurality of solid-state light sources and emits a white light with a high brightness and a favorable white balance, a long-life and high brightness projection display apparatus can be provided. Further, since the light valves are not of a time division system but three liquid crystal panels that utilize polarization, a bright and high-definition projection image with favorable color reproduction but without color-breaking can be obtained.

As mentioned above, since the projection display apparatus of the present embodiment utilizes an efficient and high brightness light source device similarly to Embodiment 1, a bright image light can be projected. The light source device is not limited to that according to Embodiment 1, but a similar effect can be obtained by using the light source device according to Embodiment 2.

The liquid crystal light valve is not limited to a transmission type liquid crystal panel but a reflection type liquid crystal panel can be used as well. When a reflection type liquid crystal panel is employed, a high definition projection display apparatus can be provided. Furthermore, for the light valve, a mirror-deflection type light valve can be used. When the mirror-deflection type light valve is used, a small and reliable projection display apparatus can be obtained.

What is claimed is:

1. A light source device comprising:
a solid-state light source unit that comprises a plurality of solid-state light sources emitting blue color light and a condensing lens;
a dichroic mirror that polarization separates a color light from the solid-state light source unit into a first polarization component and a second polarization component and that combines the blue color light with green and red color lights;
a fluorescence emission plate that is excited with the first polarization component so as to emit green and red component fluorescence and make the lights enter the dichroic mirror;
a first retardation plate that converts the second polarization component into a circularly polarized light; and
a reflection plate that reflects a light that passed through the first retardation plate and makes the light enter again the first retardation plate,
thereby combining the color light from the fluorescence emission plate and the color light that has passed again through the first retardation plate at the dichroic mirror so as to emit a white color light,
wherein a second retardation plate is arranged between the solid-state light source unit and the dichroic mirror so as to convert the polarization direction of the light from the solid-state light source unit and to control the ratio of lights of p-polarization component and s-polarization component entering the dichroic mirror.

2. The light source device according to claim 1, comprising a condensing portion that is arranged between the dichroic mirror and the fluorescence emission plate and that condenses the first polarization component polarization separated at the dichroic mirror,
wherein the light condensed at the condensing portion enters the fluorescence emission plate.

3. The light source device according to claim 1, wherein the solid-state light source is a blue semiconductor laser.

4. The light source device according to claim 1, wherein the light exiting from the solid-state light source is a linearly polarized light.

5. The light source device according to claim 1, wherein the solid-state light source unit is composed of a plurality of solid-state light source units.

6. The light source device according to claim 1, wherein the first retardation plate is a quarter wave plate.

7. The light source device according to claim 1, wherein the second retardation plate is a half wave plate.

8. The light source device according to claim 1, comprising a rotational adjusting mechanism for changing the optical axis direction of the retardation plate.

9. The light source device according to claim 1, wherein the fluorescence emission plate is of a disc shape controllable to rotate.

10. The light source device according to claim 1, wherein the fluorescence emission plate has a phosphor layer arranged proximally to the dichroic mirror and a reflective film arranged distally from the dichroic mirror relative to the phosphor layer.

11. The light source device according to claim 10, wherein the phosphor layer is formed of a Ce-activated YAG yellow phosphor.

12. The light source device according to claim 1, comprising a diffusion plate between the solid-state light source unit and the dichroic mirror.

13. A light source device comprising:
a first solid-state light source unit that comprises a plurality of first solid-state light sources and a condensing lens;
a dichroic mirror that reflects a color light from the first solid-state light source unit and combines a blue color light with green and red color lights;
a first condensing portion that condenses the color light exiting from the first solid-state light source and reflected by the dichroic mirror;
a fluorescence emission plate that is excited with the light condensed at the first condensing portion so as to emit fluorescence of green and red components and make the fluorescence enter the dichroic mirror;

a second solid-state light source unit that comprises a second solid-state light source; and a second condensing portion that condenses lights from the second solid-state light source unit, thereby combining the color light from the fluorescence emission plate and the color light from the second solid-state light source unit at the dichroic mirror so as to emit a white color light, wherein a retardation plate is arranged between the first solid-state light source unit and the dichroic mirror so as to convert the polarization direction of the light from the first solid-state light source unit so as to provide s-polarized light.

14. The light source device according to claim 13, wherein the first solid-state light source is a blue semiconductor laser.

15. The light source device according to claim 13, wherein the light exiting from the first solid-state light source is a linearly polarized light.

16. The light source device according to claim 13, wherein the second solid-state light source is a light-emitting diode.

17. The light source device according to claim 13, wherein the solid-state light source unit is composed of a plurality of solid-state light source units.

18. The light source device according to claim 13, wherein the retardation plate is a half wave plate.

19. The light source device according to claim 13, comprising a rotation adjustment mechanism for changing the optical axis direction of the retardation plate.

20. The light source device according to claim 13, wherein the fluorescence emission plate is of a disc shape controllable to rotate.

21. The light source device according to claim 13, wherein the fluorescence emission plate has a phosphor layer arranged proximally to the dichroic mirror and a reflective film arranged distally from the dichroic mirror relative to the phosphor layer.

22. The light source device according to claim 13, wherein the phosphor layer is formed of a Ce-activated YAG yellow phosphor.

23. The light source device according to claim 13, comprising a diffusion plate between the first solid-state light source unit and the dichroic mirror.

24. A projection display apparatus comprising:

a light source device that emits a white color light;

an illuminating portion that condenses the light from the light source device and forms an illumination light;

a color-separating portion that separates the white color light from the illuminating portion to respective blue, green and red color lights;

three liquid crystal light valves that spatially modulate the respective color lights that have been color-separated and form respectively image lights;

a color-combining portion that combines the image lights of blue, green and red color lights exiting from the liquid crystal light valves; and a projection lens that magnifies and projects the image lights combined by the color-combining portion, wherein the light source device is the light source device according to claim 1.

25. The projection display apparatus according to claim 24, wherein the liquid crystal light valves are constituted of transmission type liquid crystal panels.

26. A projection display apparatus comprising:

a light source device that emits a white color light;

an illuminating portion that condenses the light from the light source device and forms an illumination light;

a color-separating portion that separates the white color light from the illuminating portion to respective blue, green and red color lights;

three liquid crystal light valves that spatially modulate the respective color lights that have been color-separated and form respectively image lights;

a color-combining portion that combines the image lights of blue, green and red color lights exiting from the liquid crystal light valves; and a projection lens that magnifies and projects the image lights combined by the color-combining portion, wherein the light source device is the light source device according to claim 13.

27. The projection display apparatus according to claim 26, wherein the liquid crystal light valves are constituted of transmission type liquid crystal panels.

* * * * *